United States Patent
Lin et al.

(10) Patent No.: US 8,487,874 B2
(45) Date of Patent: Jul. 16, 2013

(54) CONTROL SYSTEM AND METHOD FOR CONTROLLING INFORMATION PROCESSING DEVICES

(75) Inventors: Chou-Cheng Lin, Hsinchu County (TW); Wen-Jong Chen, Hsinchu County (TW); Chih-Yuan Hsieh, Hsinchu County (TW); Chian-Huei Wu, Hsinchu County (TW)

(73) Assignee: Silicon Video Systems, Inc., Chupei (TW)

( * ) Notice: Subject to any disclaimer, the term of this patent is extended or adjusted under 35 U.S.C. 154(b) by 597 days.

(21) Appl. No.: 12/656,382

(22) Filed: Jan. 28, 2010

(65) Prior Publication Data

US 2011/0181515 A1    Jul. 28, 2011

(51) Int. Cl.
*G06F 3/02* (2006.01)

(52) U.S. Cl.
USPC ............. 345/168; 715/790; 710/62; 345/156; 345/157; 345/163

(58) Field of Classification Search
USPC ............... 345/156–178, 763; 715/790; 710/8, 710/62, 63, 73
See application file for complete search history.

(56) References Cited

U.S. PATENT DOCUMENTS

| 4,616,260 A * | 10/1986 | Erwin et al. ................... 348/523 |
| 7,650,445 B2 * | 1/2010 | Ma et al. .......................... 710/72 |
| 2002/0191028 A1 * | 12/2002 | Senechalle et al. ............ 345/800 |
| 2005/0206734 A1 * | 9/2005 | Kubo et al. ................. 348/207.1 |
| 2008/0016209 A1 * | 1/2008 | VanHarlingen et al. ....... 709/224 |
| 2008/0225006 A1 * | 9/2008 | Ennadi ........................... 345/171 |
| 2009/0083456 A1 * | 3/2009 | Aizawa ............................ 710/52 |
| 2010/0045611 A1 * | 2/2010 | Nelson et al. ................. 345/173 |

* cited by examiner

*Primary Examiner* — Amare Mengistu
*Assistant Examiner* — Koosha Sharifi-Tafreshi
(74) *Attorney, Agent, or Firm* — C. G. Mersereau; Nikolai & Mersereau, P.A.

(57) ABSTRACT

A control system and a method for controlling information process devices is disclosed using an additional input device with an application installed inside so that the plurality of information processing devices is controlled by a set of mouse and keyboard or the input device. The control system comprises: a mouse keyboard controller connects with a mouse, a keyboard, and an input device, wherein an application program is installed in the input device and drives the input device to communicate with the mouse keyboard controller and the plurality of information processing devices is controlled by the mouse keyboard controller.

10 Claims, 4 Drawing Sheets

CONTROL SYSTEM AND METHOD FOR CONTROLLING INFORMATION PROCESSING DEVICES

BACKGROUND OF THE INVENTION (1) Field of the Invention

The present invention generally relates to a control system and a method for controlling information processing device, more particularly, to a control system and a method for controlling a plurality of information displaying a plurality of images from at least one information processing devices on a monitor simultaneously, and selectively controlled and input by a user using a mouse and a keyboard or an input device.

(2) Description of the Prior Art

Recently, with the rapid development in information technology, information process devices have been widely used in various applications. There have been provided more and more information process devices such as the computer, the video device, the notebook, etc. Therefore, it is very often that a user may have to operate more than one information process device. Meanwhile, in order to minimize the space for the keyboards, the mouse and the monitors, a controller system is needed. A conventional controller system 100, as shown in FIG. 1, includes a video command center module 110, a mouse keyboard controller 112, a mouse 106, a keyboard 108, and a monitor 114. The video command center module 110 simultaneously and separately multi-displays a plurality of input sources (102 and 104) on at least two windows (11410 and 11420) of the monitor 114, and the video command center module 110 controlling one of the at least two windows (11410 and 11420) that is selected in accordance with the mouse signal and the keyboard signal transmitted by the mouse keyboard controller 112. Wherein, the video command center module 110 displays a mouse cursor 1142 on the windows 11410, 11420. As a result, the control the input source (102 and 104) can only be controlled by the mouse and the keyboard. Meanwhile, in order to minimize the space for the video command center, and the mouse keyboard controller is needed.

Accordingly, there is need in providing a mouse keyboard controller that can be further connected to an input device, and integrated with the video command center.

SUMMARY OF THE INVENTION

The present application is directed to a control system and a method for controlling information processing devices.

The present invention provides a control system, wherein an input device installed with an application program is connected to the mouse keyboard controller. Accordingly, the input device can communicate with the mouse keyboard controller and transmit the input device signal to the mouse keyboard controller.

The present invention provides a control system including a plurality of information, a mouse, a keyboard, an input device, a monitor, and at least one mouse keyboard controller. The plurality of information processing devices are configure to provide a plurality of video signals. A mouse is configured to provide a mouse signal. A keyboard is configured to provide a keyboard signal. An input device is configured to provide an input device signal and have an application program installed inside so as to drive the input device. A monitor is configured to displaying a plurality of windows. At least one mouse keyboard controller is connected with the plurality of information processing devices, the mouse, the keyboard, the input device, and the monitor, wherein the video signals are simultaneously and separately displayed on the plurality of windows of the monitor by the mouse keyboard controller. The input device is drove to communicate with the application program the mouse keyboard controller, and the mouse keyboard controller receives the mouse signal and the keyboard, or the input device signal, and the mouse keyboard controller controls one of the plurality of windows in accordance with the mouse signal, and the keyboard, or the input device signal.

In an aspect of the invention, the mouse keyboard controller includes a video controller, a micro unit, and a multiplexer. A mouse cursor is displayed by the video controlled. Which one of the windows overlapped the mouse cursor is detected by the micro control unit. A multiplexer is configured to receive the video signals transmitted from the video controller, and the mouse signal and the keyboard signal, or the input device signal transmitted from the micro unit, and simultaneously multi-displays the video signal on the windows of the monitor. After communicating with the input device, the application program is installed in the input device and drives the input device to communicate with the mouse keyboard controller, and the mouse keyboard controller receives the mouse signal and the keyboard signal, or the input device signal, the mouse keyboard controller selecting one of the plurality of windows and controlling the information processing device corresponding to the selected window in accordance with the mouse signal and the keyboard, or the input device signal.

The present invention provides a method for controlling information process devices, wherein the method includes detecting whether the input device is connecting with the mouse keyboard controller or not, and communicating with an application program installed in the input device to drive the input device so as to control one of the windows in accordance with the signal of the input device. Hence, a mouse cursor can also be controlled by the input device.

According to a method for controlling information processing devices, a mouse, a keyboard, an input device, a monitor; and a plurality of information processing devices is connected to at least one mouse keyboard controller. The video signal, the mouse signal, the keyboard signal, and the input device signal are separately provided by the information processing devices, the mouse, the keyboard, and the input device. A plurality of windows is provided on the monitor by the mouse keyboard controller. The resolution of a monitor is detected, and the video signals are simultaneously displayed on the windows of the monitor with the mouse keyboard controller. The input device is detected whether it connected with the mouse keyboard controller or not. The input device is drove by an application program communicating with the input device to be installed in the input device, so that one of the windows is controlled in accordance with the signal of the input device, when the mouse keyboard controller detecting the input device is connected with the mouse keyboard controller. The mouse and the keyboard are detected whether it connected with the mouse keyboard controller or not. One of the windows is selected and controlled by the mouse keyboard controller in accordance with the mouse signal and the keyboard signal, or the input device signal, when the mouse keyboard controller detecting the mouse and the keyboard are connecting with the mouse keyboard controller.

In an aspect of the invention, the mouse and the keyboard is being detected whether it connecting with the mouse and the keyboard or not, when the mouse keyboard controller detecting the input device is not connected with the mouse keyboard controller. One of the windows is selected and controlled by the mouse keyboard controller in accordance with the mouse signal and the keyboard signal, when the mouse keyboard controller detecting the mouse and the keyboard is connecting with the mouse keyboard controller.

In an aspect of the invention, the mouse keyboard includes a video controller, a micro control unit, a multiplexer in the mouse keyboard controller are provided in the mouse keyboard controller. A mouse cursor is displayed on the windows of the monitor with the video device in accordance with the mouse signal and the keyboard signal, or the input device signal. One of the windows is selected and controlled by the mouse cursor in accordance with the mouse signal and the keyboard signal, or the input device signal transmitted by the micro control unit.

In an aspect of the invention, one of the windows is selected and controlled by overlapping or double clicking the window with the mouse cursor.

It is to be understood that both the foregoing general description and the following detailed description are exemplary, and are intended to provide further explanation of the invention as claimed.

BRIEF DESCRIPTION OF THE DRAWINGS

The objects, spirits and advantages of the preferred embodiments of the present invention will be readily understood by the accompanying drawings and detailed descriptions as follows.

DETAILED DESCRIPTION OF THE PREFERRED EMBODIMENTS

In the following description, reference is made to various exemplary embodiments in which the invention may be practiced, and it is to be understood that other embodiments may be employed without departing from the invention.

The present invention providing a control system and a method for controlling information processing devices can be exemplified by the preferred embodiments as described hereinafter.

Figure 1:
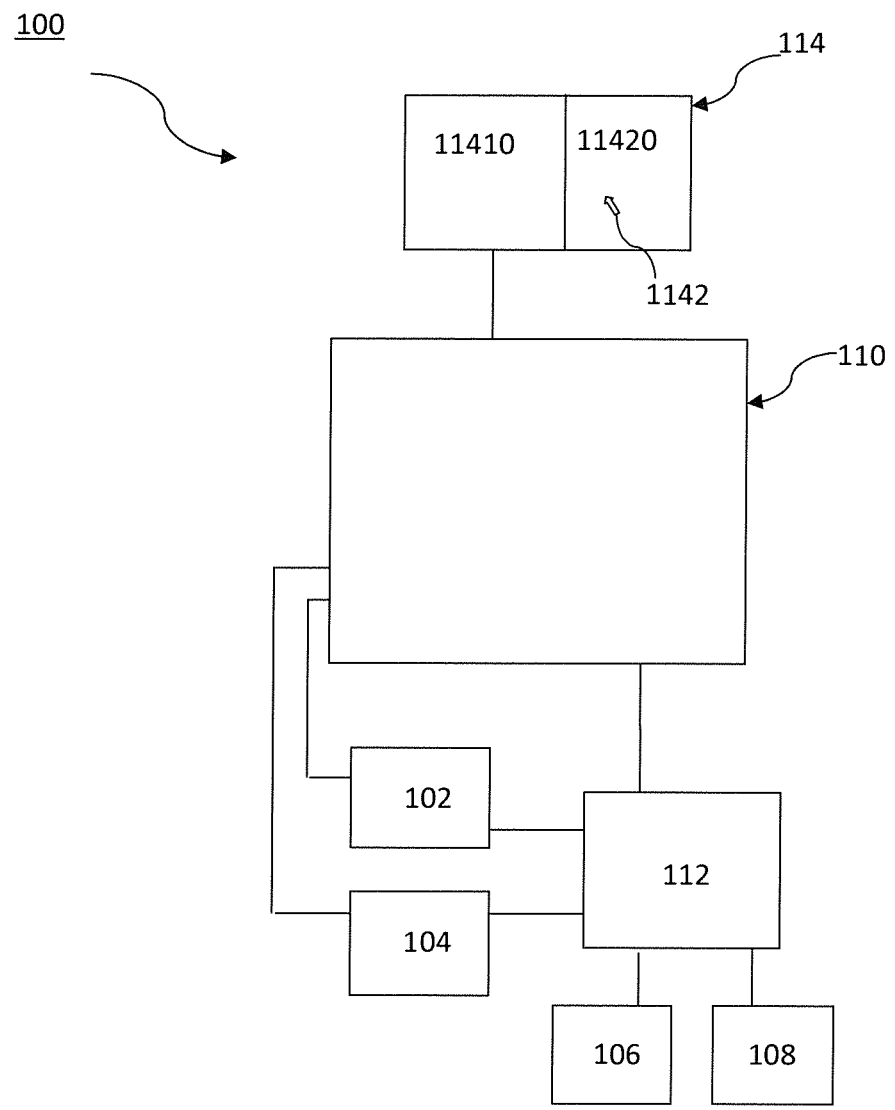
FIG. 1 is a block diagram illustrating a prior art control system with mouse keyboard controller and the video command center.
Figure 2:
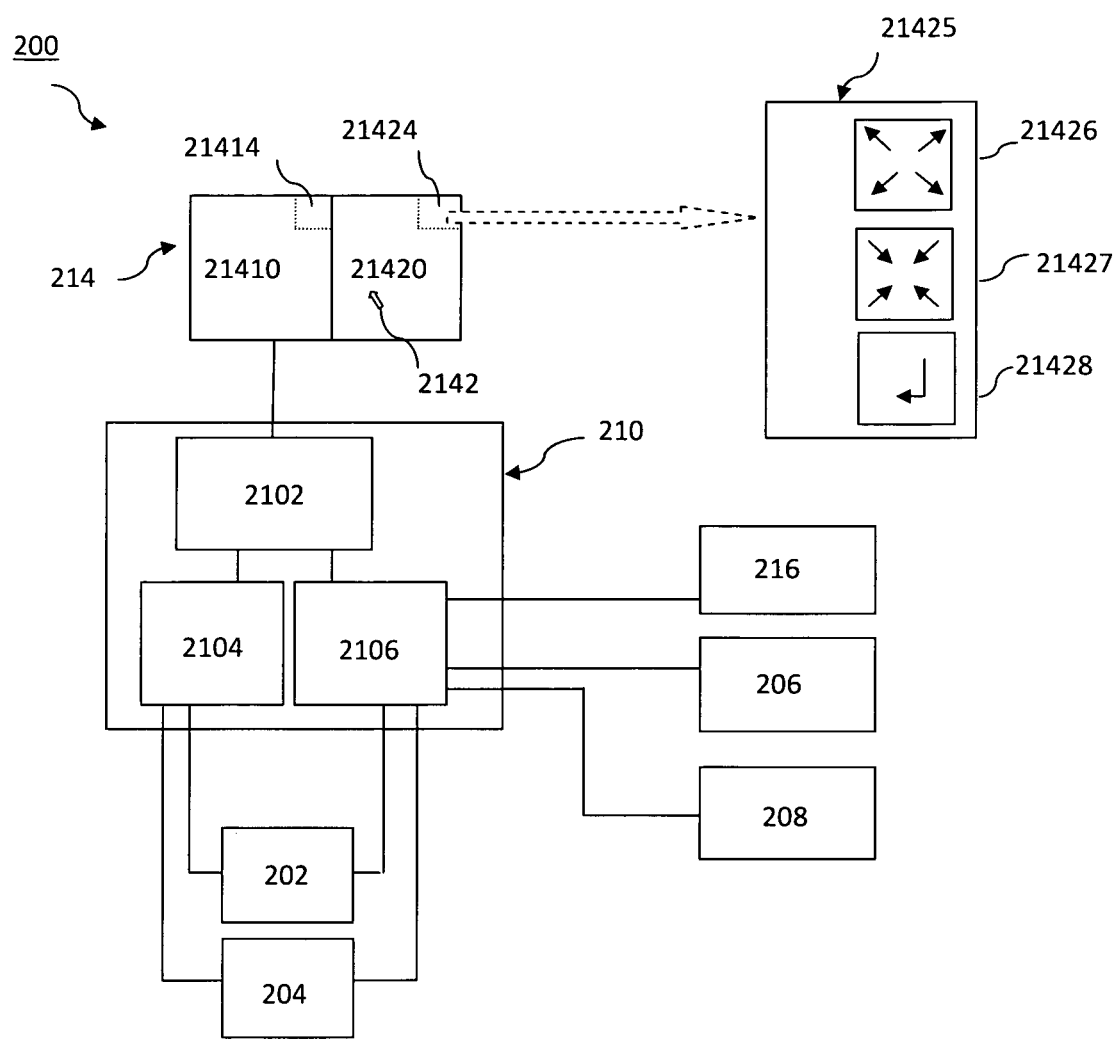
FIG. 2 is a block diagram illustrating control system in accordance with an example embodiment of the present invention.

FIG. 2 is a block diagram illustrating control system in accordance with an example embodiment of the present invention. Referring to FIG. 2, the control system 200 in the present embodiment includes a mouse keyboard controller 210, the first information processing device 202, the second information processing device 204, a monitor 214, a mouse 206, a keyboard 208, and an input device 216.

In an exemplary embodiment, the input sources of the control system 100 are the first information processing 202, and the second information processing 204. Additionally, the first information processing 202, and the second information processing 204 includes at least one computer, at least one video device, a plurality of computers, a plurality of video devices, or a video capture devices. However, the input devices in the present invention is not limited to the combination of the first information device 202 and the second information device 204, and other combination of the above-mentioned input sources.

The first information device 202 and the second information device 204 separately provide a first video signal and a second video signal. The mouse 206 and the keyboard 208 provide a mouse signal and a keyboard signal individually. The mouse keyboard controller 210 connects with the first information device 202 and the second information device 204. The input device 216 having an application program installed inside to drive the input device 216 is configured to provide an input device signal. The monitor 214 provides two windows, the first window 21410 and the second window 21420.

The mouse keyboard controller 210 connects with the first information processing device 202, the second information processing 204, the mouse 206, the keyboard 208, the input device 216 and the monitor 214, wherein the first video signal and the second video signal are simultaneously and separately displayed on the first window 21410 and the second window 21420 of the monitor 214 by the mouse keyboard controller 210. The monitor 214 having two windows connects with the mouse keyboard controller 210. After communicating with the input device 216, the application program is installed in the input device 216. The application program drives the input device 216 to communicate with the mouse keyboard controller 210, and the mouse keyboard controller receives the mouse signal and the keyboard signal, or the input device signal. The mouse keyboard controller 210 controls the second window 21420, in accordance with the mouse signal, and the keyboard, or the input device signal.

In the present embodiment, the monitor 214 is a liquid crystal display (LCD). Generally speaking, the display device includes Electroluminescent display (ELD), Cathode ray tube (CRT) display device, Liquid crystal display (LCD) display device with LED backlight, Plasma display panel (PDP) display device, Digital Light Processing (DLP) display device, Liquid crystal on silicon (LCOS) display device, Organic light-emitting diode (OLED) display device, and stereoscopic display device. However, the display device is not limited to the above-described display device. Alternatively, any kinds of display devices may be used in the present invention.

Still referring to FIG. 2, the mouse keyboard controller 210 comprises a video controller 2104, a micro control unit 2106, and a multiplexer 2102. The video controller 2104, connected with the first information processing device 202 and the second information processing device 204, is configured to receive the first video signal and the second video signal. Additionally, the video controller 2104 displays a mouse cursor 2142 on the second window 21420 of the display device 214 through the multiplexer 2102 according to the mouse signal and the keyboard signal.

The micro control unit 2106 connected with the mouse 206 and the keyboard 208 receives the mouse signal and the keyboard signal. The micro control unit 2106 detects which one of the window overlapped the mouse cursor 2142.

The multiplexer 2102, connected with the micro control unit 2106 and the video controller 2104 and the monitor 214, receives the first video signal and the second video signal transmitted from the video controller 2104 and the mouse signal and the keyboard signal, or the input device signal transmitted from the micro control unit 2106. The multiplexer 2102 simultaneously and separately multi-displays the first video signal and the second video signal on the first window 21410 and the second window 21420 of the monitor 214.

The mouse keyboard controller 210 comprises two control modes, a Host mode and a PC mode. The first window 21410 and the second window 21420 can be resized, positioned, and labeled by mouse cursor 2142 corresponding to the mouse signal and the keyboard signal, or the input device signal, when the mouse keyboard controller 210 is in the Host mode.

In the Host mode, the micro control unit 2106 detects the movement of the mouse 206 or the input device 216, and the video controller 2104 move the mouse cursor 2142 on the monitor 214 to the new position. The micro control unit 2106 detects the click action, clicking or double clicking, of the mouse 206 and the input device 216. The mouse keyboard controller 210 is switched into the PC mode and the window is selected, when the mouse cursor 2142 double clicking the window. The mouse keyboard controller 2106 controls the selected window and corresponding information process device to execute the corresponding action, when the mouse keyboard controller 210 detects the "press/release" action on the keyboard 208. It is noted that the action is not limited to the "press/release" action. Alternatively, any kinds of actions may be used in the present invention.

In the present embodiment, the mouse cursor 2142 locates on the second window 21420. That means the mouse cursor 2142 overlapping the second window 21420, and the mouse keyboard controller 210 then switches into the PC mode. The second window 21420 is selected and the second information processing device 204 is controlled by the mouse cursor 2142 corresponding to the mouse signal and the keyboard signal, or the input device signal.

In the PC mode, the micro control unit 2106 detects the movement of the mouse 206 or the input device 216, and the micro control unit 2106 transmitted the control signal to the controlling information processing device. The micro control unit 2106 detects the click action of the mouse 206 or the input device 216, and the micro control unit 2106 transmitted the control signal to the controlling information processing device. The video controller 2104 controls the selected window (second window 21420) and the micro control unit 2106 controls corresponding information process device (the second information process device 204) to execute the corresponding action, when the mouse keyboard controller 210 detects the "hot-keys press/release" action on the keyboard 208. If the hot-key is press, the mouse keyboard controller 210 switches into the Host mode. It is noted that the action being detected is not limited to the "press/release" action. Alternatively, any kinds of actions may be detected in the present invention. In another embodiment, the micro control unit 2106 further comprises an on screen display (OSD) interface to provide an alarm reporting, a label, and a border of the first window 21410 and the second window 21420. There is a first OSD area 21414 on the first window 21410, and a second OSD area 21424 on the second window 21420. A menu may pop up, when the mouse cursor 2142 moves to the first OSD area 21414 or the second OSD area 21424. The menu includes a plurality of options such as full screen, minimizing the window, and enter function. In the embodiment, as shown in the FIG. 2, the second menu 21425 is popped up, when the mouse cursor 2142 moves to the second OSD area 21424. The second menu 21425 includes the options, full screen 21426, minimizing the second window 21427, and enter function 21428. In the present embodiment, the first OSD area 21414 and the second OSD area 21424 is invisible area. It is noted, however, that the first OSD area 21414 and the second OSD area 21424 is not only limited to the type of invisible area but also the type of visible area. In the present embodiment, the first OSD area 21414 and the second OSD area 21424 are separately located on the upper right corner of the first window 21410 and the second window 11420. However, the location of the OSD area is not limited to the upper right corner of window. Alternatively, any location of the window may be applied in the present.

Figure 3:
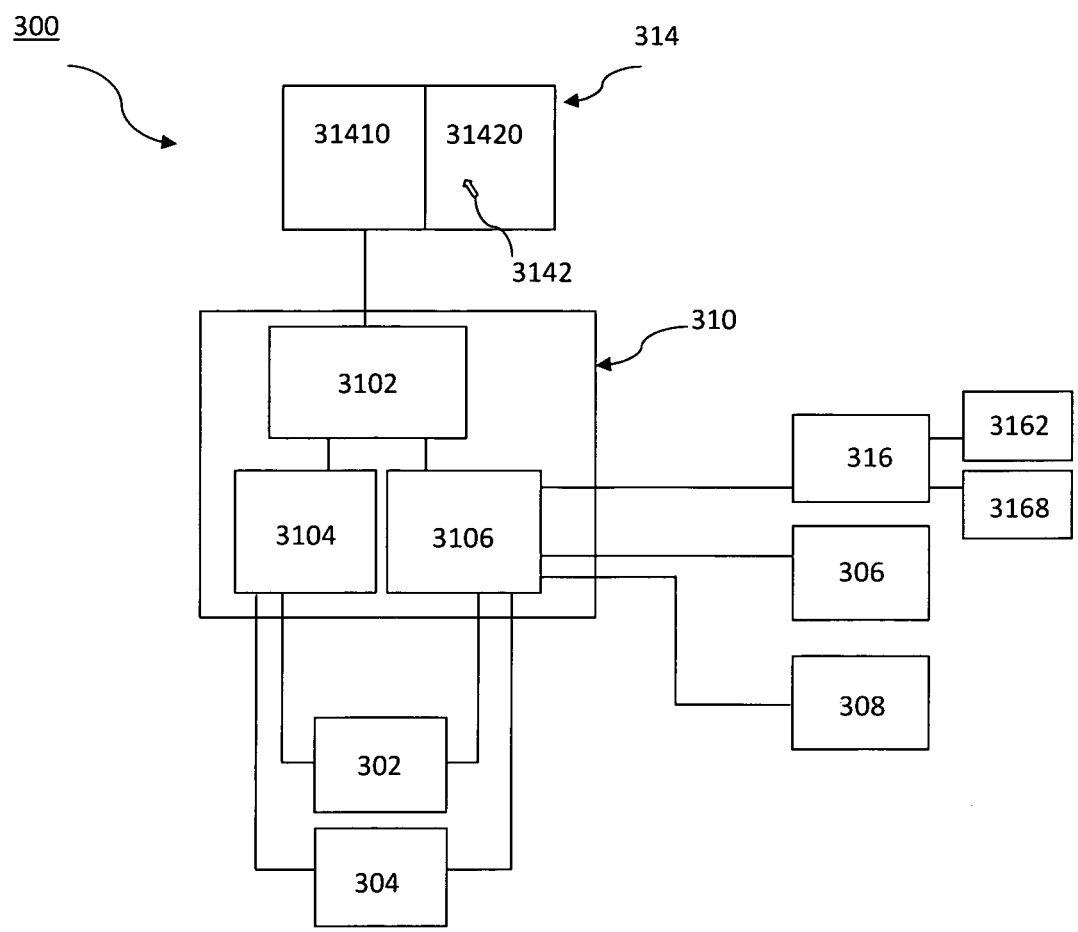
FIG. 3 is a block diagram illustrating control system in accordance with another example embodiment of the present invention.

FIG. 3 is a block diagram illustrating control system in accordance with another example embodiment of the present invention. In another embodiment, the input device is a notebook 316, as shown in FIG. 3. In the Host mode, micro control unit 3106 detects the movement of the mouse 306 or the notebook mouse 3162, and the video controller 3104 move the mouse cursor 3142 on the monitor 314 to the new position. The micro control unit 3106 detects the click action, clicking or double clicking, of the mouse 306 and the notebook mouse 3162. The mouse keyboard controller 310 is switched into the PC mode and the second window 31420 is selected, when the mouse cursor 3142 double clicking the second window 31420. The video controller 3104 controls the selected window (the second window 31420) and corresponding information process device (304) to execute the corresponding action, when the micro control unit 3106 detects the "press/release" action on the keyboard 308. Generally speaking, the input device includes a computer, a mobile device, a drawing board, or a controller. The notebook mouse 3162 can be a notebook touchpad connected to the notebook 316. It is noted that the action is not limited to the "press/release" action. Alternatively, any kinds of actions may be used in the present invention.

Figure 4:
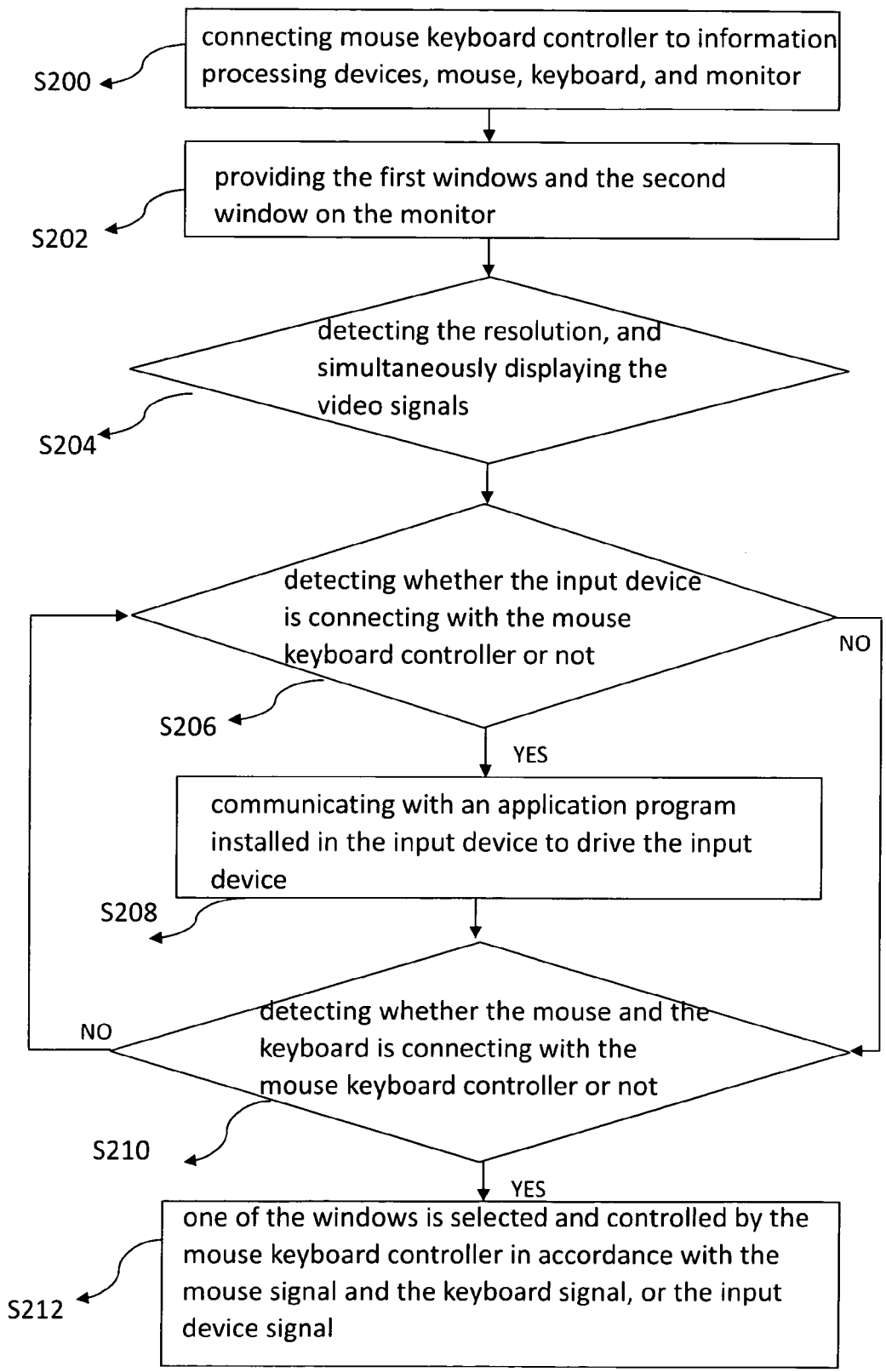
FIG. 4 is a flowchart of a method for controlling information process devices.

FIG. 4 is a flowchart of a method for controlling information process devices. As indicated in step S200, the method includes connecting at least one mouse keyboard controller 210 to a mouse 206, a keyboard 208, an input device 216, a monitor 214, and the first information processing device 202 and the second information processing device 204, referring to FIG. 2, wherein the first information processing device 202, the second information processing device 204, the mouse 206, the keyboard 208, and the input device 216 separately provide the video signal, the mouse signal, the keyboard signal, and the input device signal.

As indicated in step S202, the mouse keyboard controller 210 provides a plurality of windows on the monitor 214 with the mouse keyboard controller 210. In the present embodiment, the mouse keyboard controller 210 provides the first window 21410 and the second window 21420. In the present embodiment, the monitor 214 is a liquid crystal display (LCD). Generally speaking, the monitor 214 includes Electroluminescent display (ELD), Cathode ray tube (CRT) display device, Liquid crystal display (LCD) display device with LED backlight, Plasma display panel (PDP) display device, Digital Light Processing (DLP) display device, Liquid crystal on silicon (LCOS) display device, Organic light-emitting diode (OLED) display device, and stereoscopic display device. However, the display device is not limited to the above-described display device. Alternatively, any kinds of display devices may be used in the present invention.

In the step S204, the mouse keyboard controller 210 detects the resolution of the monitor 214, and simultaneously displays the first video signal and the second video signal on the first window 21410 and the second window 21420 of the monitor 214.

In the step S206, the mouse keyboard controller 210 detects whether the input device 216 is connected or not. The mouse keyboard controller 210 communicates with an application program installed in the input device 216 to drive the input device 216 so as to control the second windows in accordance with the signal of the input device, when the mouse keyboard controller 210 detecting the input device 216 is connected with the mouse keyboard controller 210, as indicated in step S208.

As indicated in step S210, the mouse keyboard controller 210 detects whether the mouse 206 and the keyboard 208 is connecting with or not. In the step S212, the second window 21420 is selected and controlled by the mouse keyboard controller 210 in accordance with the mouse signal and the keyboard signal, or the input device signal, when the mouse keyboard controller 210 detecting the mouse 206 and the keyboard 208 are connecting with the mouse keyboard controller 210.

In another embodiment, the method further includes detecting whether the mouse 206 and the keyboard 208 are connecting with the mouse keyboard controller 210 or not, when the mouse keyboard controller 210 detecting the input device 216 is not connected with the mouse keyboard controller 210. The second window 21420 is selected and controlled by the mouse keyboard controller 210 in accordance with the mouse signal and the keyboard signal, when the mouse keyboard controller 210 detecting the mouse and the keyboard is connecting with the mouse keyboard controller 210.

The method further includes providing a video controller 2104, a micro control unit 2106, a multiplexer 2102 in the mouse keyboard controller 210, as shown in the FIG. 2, wherein the multiplexer 2102 connects with the video controller 2104, and the video controller 2104 connects with the first information processing device 202 and the second information processing device 204, and the micro control unit 206 connects with the first information processing device 202 and the second information processing device 204.

A mouse cursor 2142 is displayed on the second window 21420 of the monitor 2142 by the video controller 2104. The second window 21420 is selected by the video controller 2104 and controlled by the mouse cursor 2142, the second information processing device 21420 corresponding to the second window 21420 is controlled by the micro control unit 2106 in accordance with the mouse signal and the keyboard signal, or the input device signal transmitted by the micro control unit 2106.

The mouse keyboard controller 210 comprises two control modes, a Host mode and a PC mode. The first window 21410 and the second window 21420 can be resized, positioned, and labeled by mouse cursor 2142 corresponding to the mouse signal and the keyboard signal, or the input device signal, when the mouse keyboard controller 210 is in the Host mode.

In the Host mode, the micro control unit 2106 detects the movement of the mouse 206 or the input device 216, and the video controller 2104 move the mouse cursor 2142 on the monitor 214 to the new position. The micro control unit 2106 detects the click action, clicking or double clicking, of the mouse 206 and the input device 216. The mouse keyboard controller 210 is switched into the PC mode and the window is selected, when the mouse cursor 2142 double clicking the window. The mouse keyboard controller 2106 controls the selected window and corresponding information process device to execute the corresponding action, when the mouse keyboard controller 210 detects the "press/release" action on the keyboard 208. It is noted that the action is not limited to the "press/release" action. Alternatively, any kinds of actions may be used in the present invention.

In the present embodiment, the mouse cursor 2142 locates on the second window 21420. That means the mouse cursor 2142 overlapping the second window 21420, and the mouse keyboard controller 210 then switches into the PC mode. The second window 21420 is selected and the second information processing device 204 is controlled by the mouse cursor 2142 corresponding to the mouse signal and the keyboard signal, or the input device signal.

In the PC mode, the micro control unit 2106 detects the movement of the mouse 206 or the input device 216, and the micro control unit 2106 transmitted the control signal to the controlling information processing device. The micro control unit 2106 detects the click action of the mouse 206 or the input device 216, and the micro control unit 2106 transmitted the control signal to the controlling information processing device. The video controller 2104 controls the selected window (second window 21420) and the micro control unit 2106 controls corresponding information process device (the second information process device 204) to execute the corresponding action, when the mouse keyboard controller 210 detects the "hot-keys press/release" action on the keyboard 208. If the hot-key is press, the mouse keyboard controller 210 switches into the Host mode. It is noted that the action is not limited to the "press/release" action. Alternatively, any kinds of actions may be used in the present invention.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A control system, the control system comprising: a plurality of information processing devices for providing a plurality of video signals; a mouse for providing a mouse signal; a keyboard for providing a keyboard signal; an input device for providing an input device signal; a monitor for displaying a plurality of windows; at least one mouse keyboard controller connected with the plurality of information processing devices, the mouse, the keyboard, the input device, and the monitor, wherein the video signals are simultaneously and separately displayed on the plurality of windows of the monitor by the mouse keyboard controller, wherein the mouse keyboard controller further comprises a video controller, a micro control unit, and a multiplexer, the video controller, connected with the plurality of information processing devices, for receiving the video signals, wherein the video controller displays a mouse cursor on plurality of windows of the monitor; the micro control unit, connected with the mouse keyboard controller, for receiving the mouse signal and the keyboard signal, or the input device signal, wherein the micro control unit detects which one of the windows overlapped the mouse cursor; the multiplexer, connected with the micro control unit and the video controller and the monitor, for receiving the video signals transmitted from the video controller and the mouse signal and the keyboard signal, or the input device signal transmitted from the micro control unit, wherein the multiplexer simultaneously multi-displays the video signal on the windows of the monitor; wherein the window overlapped the mouse cursor is selected by the mouse cursor and the corresponding information processing device is controlled in accordance with the mouse signal, and the keyboard signal, or the input device signal; and wherein after the mouse keyboard controller communicates with the input device, an application program is installed in the input device and drives the input device to communicate with the mouse keyboard controller, and the mouse keyboard controller receives the mouse signal and the keyboard signal, or the input device signal, the mouse keyboard controller selecting one of the plurality of windows and controlling the information processing device corresponding to the selected window in accordance with the mouse signal and the keyboard, or the input device signal, and any one of the windows is resized, positioned and labelled by the mouse cursor in accordance with at least one of the mouse signal and the keyboard signal, and the input device signal;

wherein the system detects whether the mouse and the keyboard are connecting with the mouse keyboard controller or not, when the mouse keyboard controller detecting the input device is not connected with the mouse keyboard controller.

2. The control system as recited in claim 1, wherein the input device is a drawing board, or a controller.

3. The control system as recited in claim 1, wherein the input device having an input mouse and an input keyboard, wherein the application program drives the input mouse and the input keyboard, and one of the windows is selected and controlled by the mouse cursor in accordance with the signal of the input mouse and the input keyboard transmitted by the micro control unit.

4. The control system as recited in claim 3, wherein the input device is a notebook, a computer, or a mobile device.

5. The control system as recited in claim 4, wherein the input mouse is a touch pad.

6. The control system as recited in claim 1, wherein one of the windows overlapped the mouse cursor or double clicked the mouse cursor is selected and controlled corresponding to the mouse signal and the keyboard signal, or the signal of the input device.

7. The control system as recited in claim 1, wherein the video controller further comprising an on screen display (OSD) interface to provide an alarm reporting, a label, and a border of the windows.

8. A method for controlling information process devices, comprising:
   connecting at least one mouse keyboard controller to a mouse, a keyboard, an input device, a monitor, and a plurality of information processing devices, wherein the information processing devices, the mouse, the keyboard, and the input device separately provide the video signal, the mouse signal, the keyboard signal, and the input device signal;
   providing a plurality of windows on the monitor with the mouse keyboard controller;
   detecting the resolution of the monitor, and simultaneously displaying the video signals on the windows of the monitor with the mouse keyboard controller;
   detecting whether the input device is connecting with the mouse keyboard controller or not;
   communicating with an application program installed in the input device to drive the input device so as to control one of the windows in accordance with the signal of the input device, when the mouse keyboard controller detecting the input device is connected with the mouse keyboard controller;
   detecting whether the mouse and the keyboard is connecting with the mouse keyboard controller or not;
   detecting whether the mouse and the keyboard are connecting with the mouse keyboard controller or not, when the mouse keyboard controller detecting the input device is not connected with the mouse keyboard controller; and
   wherein one of the windows is selected and controlled by the mouse keyboard controller in accordance with the mouse signal and the keyboard signal, or the input device signal, when the mouse keyboard controller detecting the mouse and the keyboard are connecting with the mouse keyboard controller, and any one of the windows is resized, positioned and labelled by the mouse cursor in accordance with at least one of the mouse signal and the keyboard signal, and the input device signal.

9. The method as recited in claim 8, further comprising:
   providing a video controller, a micro control unit, a multiplexer in the mouse keyboard controller, wherein the multiplexer connects with the video controller, and the video controller connects with the information processing devices, and the micro control unit connects with the information processing devices;
   displaying a mouse cursor on the windows of the monitor with the video controller in accordance with the mouse signal and the keyboard signal, or the input device signal; and
   wherein one of the windows is selected by the video controller and controlled by the mouse cursor, the information processing device corresponding to the window being selected is controlled by the micro control unit in accordance with the mouse signal and the keyboard signal, or the input device signal transmitted by the micro control unit.

10. The method as recited in claim 9, further comprising selecting and controlling one of the windows by overlapping or double clicking the window with the mouse cursor.

* * * * *